United States Patent
Emery et al.

(10) Patent No.: US 6,318,963 B1
(45) Date of Patent: Nov. 20, 2001

(54) GAS TURBINE AIRFOIL INTERNAL AIR SYSTEM

(75) Inventors: Martin A J Emery; Kevin P Self, both of Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/580,595

(22) Filed: May 30, 2000

(30) Foreign Application Priority Data

Jun. 9, 1999 (GB) .................................................. 9913393

(51) Int. Cl.[7] ...................................................... F01D 5/18
(52) U.S. Cl. ................................................ 416/96 A; 416/97
(58) Field of Search ................................. 416/96 A, 97 R

(56) References Cited

U.S. PATENT DOCUMENTS 4,257,734 * 3/1981 Guy et al. ........................... 416/96 A
5,779,438 * 7/1998 Wilfert .............................. 416/96 A
6,238,182 * 5/2001 Meyer .............................. 416/96 A

FOREIGN PATENT DOCUMENTS 0 965 728 A2  12/1999  (EP) .

* cited by examiner

*Primary Examiner*—John Kwon
(74) *Attorney, Agent, or Firm*—Oliff & Berridge, PLC

(57) ABSTRACT

A hollow airfoil (8) has an internal air system in which a cooling gap (44) adjacent the internal surface (52) is formed by a liner insert (14) consisting of a shaped panel (14a). At least some of the cooling air circulating through the gap (44) enters through a screening arrangement, comprising exclusion apertures (50), which removes particulates over a predetermined size (e). The air is fed into a plenum chamber (46) which may be formed by a pressing in the insert panel (14a). There are two exits from the plenum (46): a first is through the screening arrangement to admit filtered air to the wall cooling gap (44), and a second is via apertures (54) in the airfoil wall (18) the sizes (d) of which apertures are large enough to pass the screened particulates into the gas path.

7 Claims, 2 Drawing Sheets

GAS TURBINE AIRFOIL INTERNAL AIR SYSTEM

The invention relates to improvements in a gas turbine airfoil internal air system.

In particular it concerns improvements for screening particulates over a predetermined size carried in the air system and discharging said oversize particulates.

There is a need to cool certain components such as nozzle guide vanes in gas turbine engines by providing a flow of relatively cool air to the interior of the airfoil section. Simply making the airfoil sections hollow and flowing air therethrough is inefficient at cooling and wasteful of air. It is preferable to concentrate cooling air in certain regions of the airfoil and one way of doing this is by way of directing concentrated jets of cooling air at certain parts of the internal surface, in a technique known as impingement cooling. The airfoil is made, usually cast, as a hollow section with internal locating features which position an insert, comprising a perforate panel or sheet, a short distance away from the internal surface. When the internal cavities are connected to a source of pressurised cooling air small holes in the panel cause jets of cooling air to impinge on the interior walls of the airfoil. In addition, small holes may be provided through the airfoil walls to allow some of the spent cooling air to diffuse therethrough and establish an air film over the external surface.

A drawback of internal air systems of this kind is susceptibility of the small holes to blockage by large particulates which may be carried in the cooling air flow. This drawback is especially evident when the gas turbine engine is operated in environments where large air borne particulates, eg dust and sand particles, are present. The particulates accumulate in the air system progressively causing blockages which disrupt the cooling air supply. When these blockages become significant affected parts of the cooled component overheat and rapidly begin to suffer heat related damage. Component failure can occur quite quickly. Our co-pending application GB 9813251.7 (Agents Ref BL 2637 UK) and subsequent applications claiming priority therefrom, provides a solution to these problems by seeking to exclude particulates above a certain size from parts of the air system with holes and passages small enough to be susceptible to blocking by those particulates, and ensuring that even where particles become trapped etc supply of cooling air is not prematurely inhibited. These arrangements ensure that a supply of cooling air is maintained at a predetermined level for a much longer period of time than has been achieved previously. However, in order to avoid a build-up of screened particulates causing further blockages it is necessary to discharge them from the air system.

The present invention seeks to provide a solution to this further problem and may be used alone or in conjunction with the above mentioned previous arrangements to effect the complete removal and discharge of oversize particulates from the internal air system.

Therefore, according to one aspect of the present invention there is provided a gas turbine airfoil having an internal air system comprises means for screening solid particulates over a predetermined size, a plenum where said oversize particulates may be isolated and discharge means leading from said plenum into an external airflow to discharge the oversize particles.

A preferred embodiment of the present invention will now be described by way of example to illustrate how the invention may be carried into practice, wherein reference will be made to the accompanying drawings, in which.

The general layout of a gas turbine engine is well known, and it is not proposed to detail it here. It will be understood therefore that in a conventional style of engine the rotary stages are interdigitated with stator rings, usually called guide vanes or nozzle guide vanes. Those stages downstream of the combustor may be cooled internally and provided with exterior surface film cooling by an internal air system in which relatively cooler air is sourced from the compressor.

Figure 1:
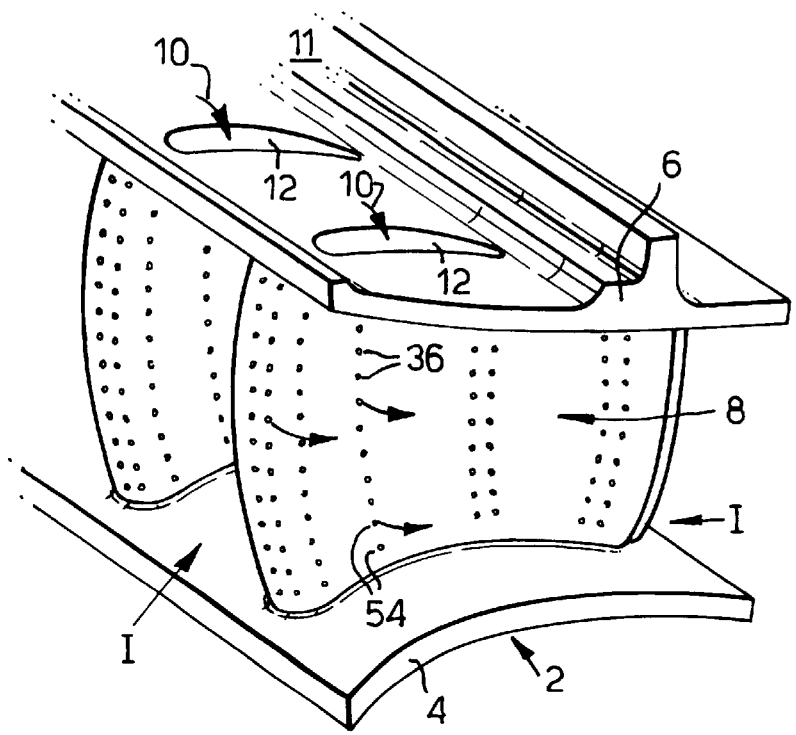
FIG. 1 shows a perspective view of a nozzle guide vane segment.

One such nozzle guide vane ring is made up of a number of guide vane segments, one of which is illustrated in the perspective view of FIG. 1, assembled in end-to-end abutment around the gas path. The guide vane segment generally indicated at 2 comprises radially inner and outer platform 4,6 respectively spaced apart to form the corresponding wall of the gas path. A plurality of hollow guide vanes such as that generally indicated at 8 extend in radial directions between the platforms 4,6. The interiors of the guide vanes 8 are supplied with cooling air shown by arrows 10 from a plenum cavity 11 immediately surrounding the outer platforms 6. It will be self evident, therefore, that in this particular example the cooling air flow 10 enters the interior 12 of the guide vanes 8 in a radially inward direction.

Figure 2:
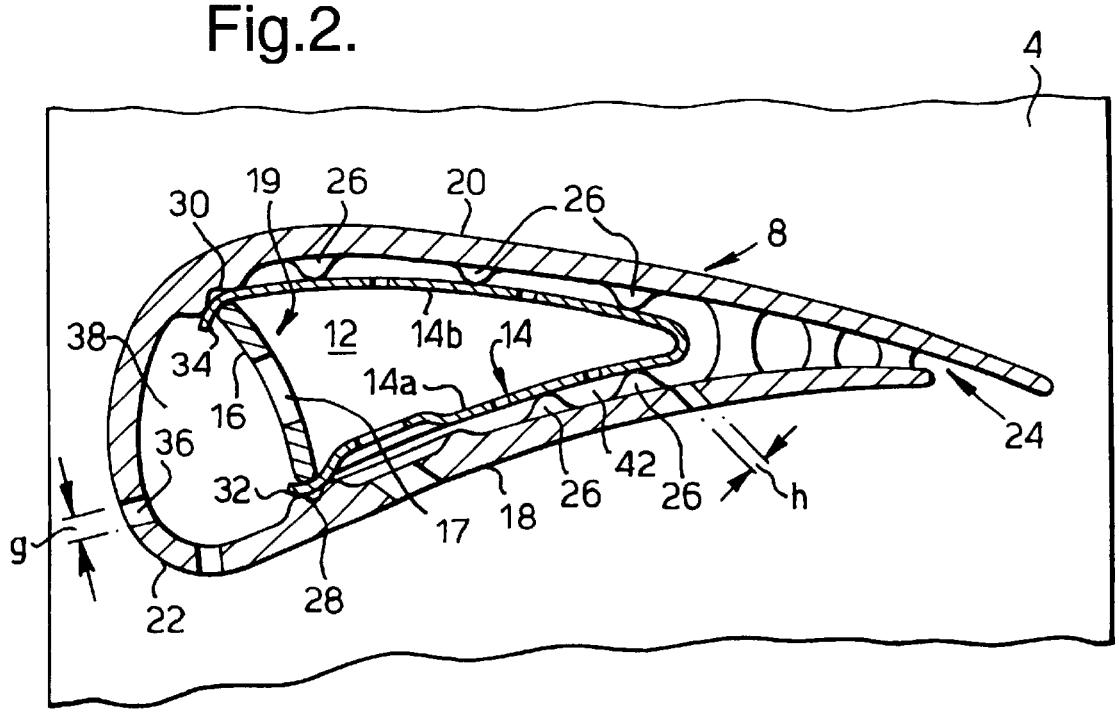
FIG. 2 shows a cross-section of a guide vane on line I—I in FIG. 1.

FIG. 2 illustrates the interior of a guide vane in more detail. The hollow interior cavity 12 of the vane 8 is divided into several chambers by sheet metal inserts 14, 16. Initially the vane 8 is cast with a single internal cavity bounded by pressure and suction surface side walls 18,20 respectively and which converge towards the leading and trailing edges 22,24. The side walls 18,20 on their internal surfaces are provided with several integrally cast features, namely a plurality of discrete pedestals 26 (which appear in the drawings as inwardly facing "mushroom" shaped projections), spaced apart over the internal surface from approximately mid-chord towards the trailing edge 24, and a pair of opposite facing radial grooves 28,30 which extend full span height of the vane at approximately maximum chord. The first insert 14 extends the full span height of the blade and consists of a single roughly V-shaped sheet joined towards the trailing edge to form two side panels 14a, 14b. The distal margins 32,34 of these panels are formed as flutes sized to engage the wall grooves 28,30 respectively.

The insert 14 is sprung into the interior of the vane such that the flutes 32,34 engage wall grooves 28,30 and the tips of the plurality of pedestals 26 abut the surfaces of panels 14a,14b. The insert 14 thus constitutes a liner in the interior of the airfoil defining a cooling gap adjacent the interior surface of the side walls 18,20 the width of which is determined by the height of the pedestals 26. The second insert 16 comprises a separate panel or member which is slid into position across the gap between the flutes 32,34 of the first insert, and tends to reinforce engagement of the flutes with the wall grooves 28,30. This second insert may comprise a member or plate as described in our co-pending GB Patent Application No 9813251.7.

Internal cooling consists of several elements: the interior volume 12 bounded by the insert panels 14a,14b and the insert 16 receives cooling air from a source (not shown) which enters through a radially outer end of the airfoil section (FIG. 1). A portion of this air passes through holes 17 in the panel 16 to form impingement cooling jets in a forward chamber or space 38 behind the airfoil leading edge 22. The remainder of the air entering the volume 12 is divided between impingement cooling holes 45 in the liner panels 14a, 14b, the filtering or screening arrangement which supplies air into the liner wall cooling gap 42, and a small amount used to eject filtered oversize particulates.

For the purposes of exterior cooling the walls 18,20 of the vane are pierced by a multiplicity of effusion cooling holes such as that indicated at 36 in FIGS. 1 and 2. In the forward part of the vane 2, that is to the left of the partition member 16 in FIG. 1, the holes 36 communicate with a forward chamber 38 which is supplied with pressurised cooling air via the impingement holes 17 in the member 16. Corresponding effusion cooling holes 40 in the rearward part of the vane aft of partition 16 communicate with a narrow gap 42 created between insert 14 and the inner surface of the vane walls 18,20. As mentioned above the width of this gap 42 is determined by the height of the pedestals 26 against which the insert 14 is abutted. The pedestals 26 are isolated from each other and significantly increase the surface area of the vane walls 18,20 exposed to cooling flow and, of course, they co-operate to constituent multi-path, interconnected passages for the cooling flow.

Figure 3:
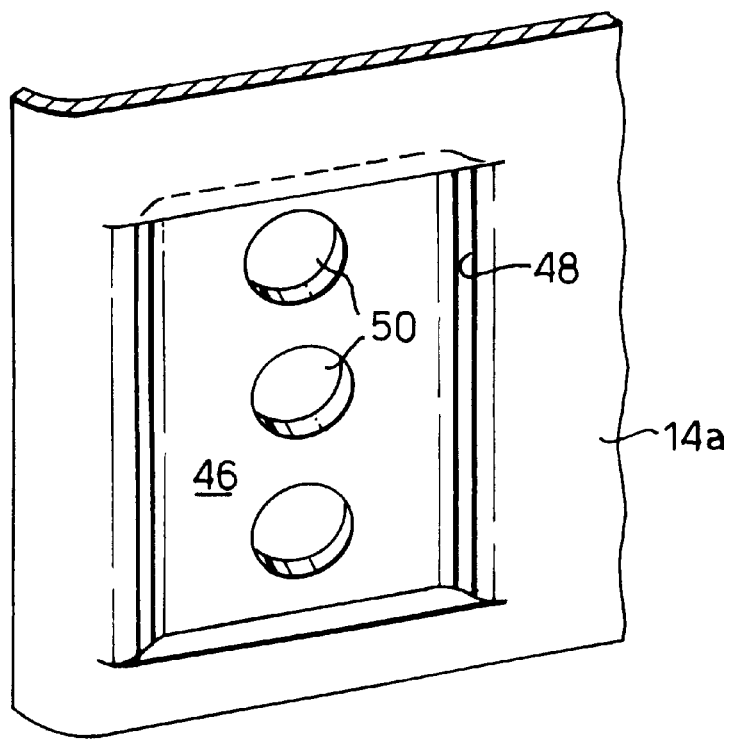
FIG. 3 shows a detail of the guide vane liner insert in the region of the discharge means.
Figure 4:
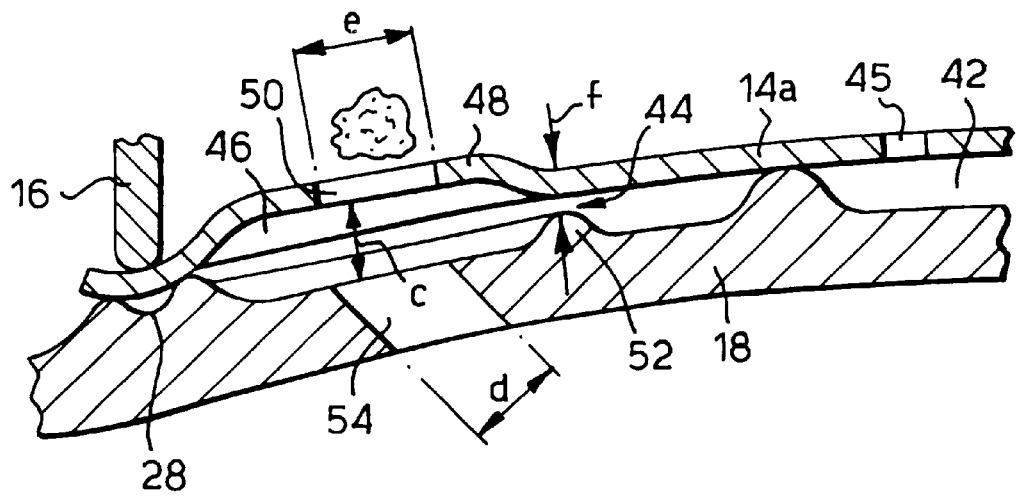
FIG. 4 shows a close-up view of the discharge means arrangement including the liner of FIG. 3.

Cooling air flow to the gap 42 is provided via a screening or gating arrangement shown in FIGS. 3 and 4 which removes particles above a predetermined size and discharges the screened particles into the gas path. At least a substantial proportion of the cooling flow through gap 42 (and in some arrangements all of it) enters the gap through a discriminating slot or screening barrier 44. Impingement cooling of the vanes walls 18 may also be provided through cooling holes 45 formed in the walls 14a, 14b of the liner insert 14. The cooling air flowing through the space or gap 42 between liner 14 and vane walls 18,20 is exhausted either through the trailing edge 24 or the effusion cooling holes 40.

Referring now to FIG. 3 a plenum 46 is formed by a concavity, in this particular embodiment a shallow rectangular sump 48, pressed into the wall of the insert panel 14a. The back wall of the sump 48 is pierced by a plurality of apertures 50 (three in the drawing, in general there is at least one such aperture) which provide open communication with the interior space 12 of the vane. Preferably the plenum 46, and therefore the sump 48, is located at the opposite end of the vane span to cooling air entry. Thus, in the illustrated embodiment where air entry is through the radially outer vane platform 6 the plenum 46 etc is located at the radially inner end of the vane span adjacent platform 4, and towards one of the grooves 28 which locates the partition member 16. In the example being described, and illustrated in the drawings, two sides of the rectangular plenum 46 are not open to flow. One side adjacent the partition member 16 is closed by the member 16 forcing the panel 14a into sealing contact with the vane wall 18 along the edge of groove 28. A second side towards the inner platform 4 is effectively sealed by a floor 19 against which the radially inner edge of the panel 14a abuts. Air flow out of the plenum 46 into the gap 42 is possible on two sides so the screening gap 44 is formed on these sides between the surface of the insert panel 14a and a raised formation 52 in the vane wall 18. The raised formation 52 may constitute an "L-shaped" portion opposite two sides of the sump 48. The gap "f" in FIG. 4 between the tip of the raised formation 52 and the panel 14a comprises a screening aperture which excludes particulates of greater size than gap width "f" from the cooling space 42.

Oversize particles may therefore accumulate in the plenum 46 except there is provided discharge means leading from the plenum through the vane wall 18 into the external air flow comprising at least one discharge aperture 54. Preferably the or each discharge aperture 54 is angled rearwardly and is positioned opposite a corresponding aperture 50 in the back wall of the plenum. The size(s) of the apertures 50,54 may be the same but this is not necessary. However the size of the apertures "e" and "d" respectively must be greater than the maximum size of particle permitted to pass through the remaining apertures. Furthermore the width "f" of the screening slot 44 must be less than the size "h" of the effusion cooling holes 40 leading from the wall gap 42 through the vane walls 18.

In operation, cooling air enters the main cavity 12 of the vane; a proportion passes through partition 16 into the forward cavity for discharge through leading edge surface film cooling holes 36, a further proportion is utilised for impingement cooling of vane walls 18,20 through holes 45 in the insert panels 14a, 14b; and the balance is inducted into the space 42 between the panels and the vane walls through plenum 46 and screening gap 44. The common path is these cooling flows is the first section in cavity 12 and experience reveals that larger particulates in the flow tend to accumulate at the downstream end of this section. In the present arrangement the plenum 46 is located in this region and the path through discharge apertures 46,54 is effective in removing the larger particles by ejecting the particulates in a stream of air passing from inner aperture(s) 50 through the plenum chamber 46 and exiting into the gas path through outer aperture(s) 54.

What is claimed is:

1. A gas turbine airfoil having an internal air system provided with a wall cooling arrangement comprises means for screening solid particulates over a predetermined size in the air flow of the internal air system, a plenum for isolating said oversize particulates, and discharge means leading from said plenum into an external airflow to discharge the oversize particles, wherein the plenum comprises a chamber adjacent a side wall of the airfoil and the wall cooling arrangement is formed by means of an insert spaced from the interior of the airfoil side wall by a predetermined gap to form the plenum chamber and a gap of narrow width through which the wall cooling arrangement is supplied with cooling air from the plenum chamber.

2. A gas turbine airfoil as claimed in claim 1 wherein the means for screening solid particulates is disposed between the plenum chamber and the wall cooling arrangement to screen particulates carried by the cooling air fed therebetween.

3. A gas turbine airfoil as claimed in claim 1 wherein the plenum chamber is formed by a concavity formed in the insert.

4. A gas turbine airfoil as claimed in claim 3 wherein the insert comprises a sheet metal panel and the concavity forming the plenum chamber is pressed into a wall of the panel.

5. A gas turbine airfoil as claimed in claim 1 wherein the discharge means comprises at least one open aperture communicating between the plenum and the external airflow.

6. A gas turbine airfoil as claimed in claim 5 wherein cooling air enters the plenum through at least one inlet aperture in a wall of the plenum which receives air from the internal air system.

7. A gas turbine airfoil as claimed in claim 6 wherein the at least one inlet aperture and the at least one discharge aperture are substantially co-axial.

* * * * *